(12) United States Patent
Liao et al.

(10) Patent No.: US 12,378,407 B2
(45) Date of Patent: Aug. 5, 2025

(54) RESIN COMPOSITION

(71) Applicant: NAN YA PLASTICS CORPORATION, Taipei (TW)

(72) Inventors: Te-Chao Liao, Taipei (TW); Chien Kai Wei, Taipei (TW); Hung-Yi Chang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 591 days.

(21) Appl. No.: 17/855,827

(22) Filed: Jul. 1, 2022

(65) Prior Publication Data

US 2023/0167297 A1    Jun. 1, 2023

(30) Foreign Application Priority Data

Nov. 26, 2021  (TW) .................................. 110144104

(51) Int. Cl.
  *C08L 75/00*    (2006.01)
  *C08J 5/24*    (2006.01)

(52) U.S. Cl.
  CPC ............... *C08L 75/00* (2013.01); *C08J 5/244* (2021.05); *C08J 5/249* (2021.05); *C08J 2375/00* (2013.01); *C08J 2445/00* (2013.01); *C08J 2471/12* (2013.01); *C08L 2201/02* (2013.01); *C08L 2203/20* (2013.01)

(58) Field of Classification Search
  CPC ............... C08J 2375/00; C08J 2379/04; C08J 2445/00; C08J 2471/12; C08J 2479/08; C08J 5/244; C08J 5/249; C08L 2201/02; C08L 2203/20; C08L 75/00; C08L 79/04
  See application file for complete search history.

(56) References Cited

U.S. PATENT DOCUMENTS

| | | |
|---|---|---|
| 10,544,255 B2 | 1/2020 | Xu et al. |
| 2013/0075138 A1 | 3/2013 | Yu et al. |
| 2020/0123307 A1 | 4/2020 | Huang et al. |

FOREIGN PATENT DOCUMENTS

| | | |
|---|---|---|
| CN | 102838864 | 12/2012 |
| CN | 104559055 | 4/2015 |
| CN | 108047718 | 7/2020 |
| CN | 113025263 | 6/2021 |
| CN | 115537023 | 12/2022 |
| JP | 2017071689 | 4/2017 |
| JP | 2018053092 | 4/2018 |
| JP | 2019137841 | 8/2019 |
| TW | 202030260 | 8/2020 |

OTHER PUBLICATIONS

JP 2019-137841 A (Tamura) (Aug. 22, 2019) machine translation.*
"Office Action of Taiwan Counterpart Application", issued on Dec. 7, 2022, p. 1-p. 5.

* cited by examiner

*Primary Examiner* — Ana L. Woodward
(74) *Attorney, Agent, or Firm* — JCIPRNET

(57) ABSTRACT

A resin composition, including resin and imidazole, is provided. The resin includes cyanate ester resin and bismaleimide resin, and the imidazole does not have acidic hydrogen.

8 Claims, No Drawings

RESIN COMPOSITION

CROSS-REFERENCE TO RELATED APPLICATION

This application claims the priority benefit of Taiwan application serial no. 110144104, filed on Nov. 26, 2021. The entirety of the above-mentioned patent application is hereby incorporated by reference herein and made a part of this specification.

BACKGROUND

Technical Field

The disclosure relates to a composition, and particularly relates to a resin composition.

Description of Related Art

Compositions of thermosetting resin are widely used in electronic equipment and other fields for having a crosslinking structure and exhibiting high heat resistance or dimensional stability. Furthermore, cyanate ester (CE) resin used in the thermosetting resin has characteristics such as flame retardancy and high glass transition temperature (Tg). However, due to reactivity, a substrate made of the resin does not have good heat resistance and electrical performance.

SUMMARY

The disclosure provides a resin composition, which may effectively improve heat resistance and electrical performance of a substrate made of the resin composition.

A resin composition of the disclosure includes resin and imidazole. The resin includes cyanate ester resin and bismaleimide resin, and the imidazole does not have acidic hydrogen.

In an embodiment of the disclosure, the imidazole includes 1-cyanoethyl-2-phenylimidazole, 1-benzyl-2-phenylimidazole, thiabendazole, or a combination of the above.

In an embodiment of the disclosure, the imidazole is 1-benzyl-2-phenylimidazole.

In an embodiment of the disclosure, the imidazole does not include 2-ethyl-4-methylimidazole.

In an embodiment of the disclosure, an amount of the imidazole used is between 0.1 parts by weight and 4 parts by weight, compared to a total of 100 parts by weight of the resin.

In an embodiment of the disclosure, an amount of the imidazole used is 1 part by weight.

In an embodiment of the disclosure, a proportion of the cyanate ester resin used in the resin is between 10 wt % and 60 wt %, and a proportion of the bismaleimide resin used in the resin is between 10 wt % and 50 wt %.

In an embodiment of the disclosure, the resin composition further includes at least one of a flame retardant and an inorganic filler.

In an embodiment of the disclosure, an amount of the flame retardant used is between 5 parts by weight and 30 parts by weight, compared to a total of 100 parts by weight of the resin.

In an embodiment of the disclosure, an amount of the inorganic filler used is between 80 parts by weight and 180 parts by weight, compared to a total of 100 parts by weight of the resin.

Based on the above, the resin composition of the disclosure selects the imidazole with favorable selectivity to reaction systems and without acidic hydrogen as a catalyst to improve reactivity of the resin that includes the cyanate ester resin and the bismaleimide resin, so the heat resistance and electrical performance of the substrate made of the resin composition may be effectively improved.

In order for the features and advantages of the disclosure to be more comprehensible, the following embodiments are cited and described in detail as follows.

DESCRIPTION OF THE EMBODIMENTS

In this embodiment, a resin composition includes resin, and the resin includes cyanate ester resin and bismaleimide (BMI) resin. In addition, the resin composition of this embodiment includes imidazole without acidic hydrogen, and selects the imidazole with favorable selectivity to reaction systems and without acidic hydrogen as a catalyst to improve reactivity of the resin that includes the cyanate ester resin and the bismaleimide resin, so heat resistance and electrical performance of a substrate made of the resin composition may be effectively improved. Furthermore, when the selected catalyst has the acidic hydrogen, the acidic hydrogen is likely to contain moisture in subsequent plates, increase conductivity after dissociation, and further affect relevant performance (such as electrical performance). Therefore, the resin composition in this embodiment uses the imidazole without acidic hydrogen as the catalyst, which may solve the problem of excessive moisture in the subsequent plates and maintain a low coefficient of thermal expansion (CTE).

In an embodiment, the imidazole with favorable selectivity to reaction systems includes 1-cyanoethyl-2-phenylimidazole (2PZCN; CAS: 23996-12-5;

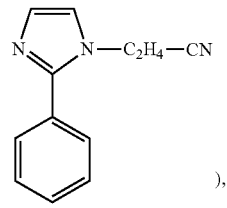

), 1-benzyl-2-phenylimidazole (1B2PZ; CAS: 37734-89-7;

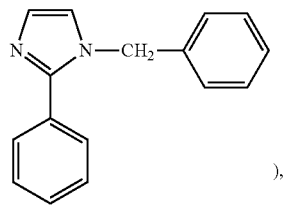

), thiabendazole (TBZ; CAS: 7724-48-3;

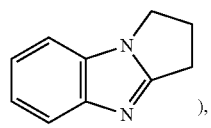 [SMILES: c1ccc2c(c1)nc1n2CCC1]

), or a combination of the above. The imidazole that has the best improvement effect is, for example but not limited to, 1-benzyl-2-phenylimidazole. Other suitable imidazole without acidic hydrogen may be selected according to actual design requirements.

In an embodiment, a structure having acidic hydrogen on nitrogen belongs to a polar functional group, thus affecting electrical Df level. Therefore, the imidazole does not include 2-ethyl-4-methylimidazole (2E4MZ; 2E4MZ; CAS: 931-36-2;

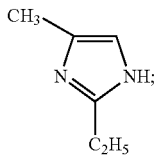

with acidic hydrogen located at NH) to maintain performance of a subsequently produced substrate, but the disclosure is not limited thereto.

In an embodiment, the amount of the imidazole used is between 0.1 parts by weight and 4 parts by weight, compared to a total of 100 parts by weight of the resin. Preferably, the amount of the imidazole used is 1 part by weight, but the disclosure is not limited thereto.

In an embodiment, to improve system reactivity, the resin composition may further include peroxide, and the imidazole and the peroxide may be regarded as promoters. Furthermore, the peroxide may be tert-butyl cumyl peroxide, dicumyl peroxide (DCP), benzoyl peroxide (BPO), 2,5-dimethyl-2,5-di(tert-butylperoxy)hexane, 2,5-dimethyl-2,5-di(tert-butylperoxy)hexyne, 1,1-di-(tert-butylperoxy-3,3,5-trimethylcyclohexane, di(tert-butylperoxyisopropyl)benzene, Luf, but the disclosure is not limited to the above examples.

In an embodiment, the amount of the peroxide used is between 0.1 wt % and 3 wt %, compared to a total of 100 parts by weight of the resin, but the disclosure is not limited thereto.

In some embodiments, the weight proportion of the cyanate ester resin in the resin is between 10 wt % and 60 wt % (for example, 10 wt %, 15 wt %, 20 wt %, 25 wt %, 30 wt %, 35 wt %, 40 wt %, 50 wt %, 60 wt %, or any value within 10 wt % to 60 wt %), while the weight proportion of the bismaleimide resin in the resin is between 10 wt % and 50 wt % (for example, 10 wt %, 15 wt %, 20 wt %, 25 wt %, 30 wt %, 40 wt %, 45 wt %, 50 wt %, or any value within 10 wt % to 50 wt %).

In an embodiment, the weight-average molecular weight (Mw) of the cyanate ester resin is between 100 g/mol and 70000 g/mol. For example, the Mw of the cyanate resin is between 100 g/mol and 5000 g/mol, and the Mw of the cyanate resin between 100 g/mol to 3000 g/mol gives favorable effect, but the disclosure is not limited thereto. In addition, the viscosity of the cyanate ester resin at 25° C. may be 425 mPa·s to 475 mPa·s. When the Mw or viscosity of the cyanate resin falls within the above range, the crosslinking characteristics of the resin composition may be effectively improved without causing any negative effect on the overall viscosity and processability of the resin composition, which facilitates the subsequent application of thermosetting resin materials.

In an embodiment, the cyanate ester resin may include one or more compounds or polymers having cyanate groups.

In another embodiment, the cyanate ester resin has an average number of two or more cyanate ester groups. In further another embodiment, the cyanate ester resin is a symmetric structure, which means the cyanate ester resin may be represented by the following chemical formula: "NCO—R—OCN". For example, it may be bisphenol A cyanate ester or bisphenol M cyanate ester, but the disclosure is not limited thereto.

In an embodiment, the bismaleimide resin may use bisphenol A as the main structure, end-capped with maleimide and grafted with an alkyl group having 1 to 5 carbon atoms on the main structure of bisphenol A. Specifically, the structure of the bismaleimide resin is represented by the following structural formula, in which each of Ra, Rb, Rc, and Rd is an alkyl group having 1 to 5 carbon atoms. Preferably, each of Ra, Rb, Rc, and Rd is an alkyl group having 1 to 3 carbon atoms. In another embodiment, Ra and Rc are methyl groups, while Rb and Rd are ethyl groups, but the disclosure is not limited thereto.

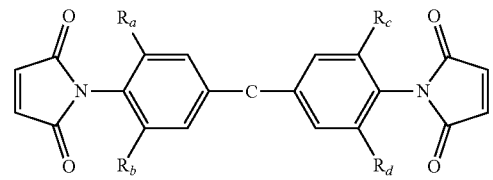

In an embodiment, the bismaleimide resin may be biphenyl bismaleimide, 4,4'-diphenylmethane bismaleimide, but the disclosure is not limited thereto.

In an embodiment, the resin may further include one or more of polyphenylene ether resin, a crosslinking agent, and liquid rubber resin. The weight proportion of the polyphenylene ether resin in the resin is between 10 wt % and 30 wt % (for example, 10 wt %, 15 wt %, 20 wt %, 25 wt %, 30 wt %, or any value within 10 wt % to 30 wt %), the weight proportion of the crosslinking agent in the resin is between 0 wt % and 20 wt % (for example, 0 wt %, 5 wt %, 10 wt %, 15 wt %, 20 wt %, or any value within 0 wt % to 20 wt %), and the weight proportion of the liquid rubber resin in the resin is between 0 wt % and 20 wt % (for example, 0 wt %, 5 wt %, 10 wt %, 15 wt %, 20 wt %, or any value within 0 wt % to 20 wt %).

In an embodiment, the liquid rubber resin may be polybutadiene and may have the following structure, where n=15 to 25, and preferably n=16 to 22:

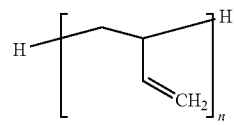

In an embodiment, the liquid rubber resin may be polyolefin and includes without being limited to: styrene-butadiene-divinylbenzene terpolymer, styrene-butadiene-maleic anhydride terpolymer, vinyl-polybutadiene-urethane oligomer, styrene-butadiene copolymer, hydrogenated styrene-butadiene copolymer, styrene-isoprene copolymer, hydrogenated styrene-isoprene copolymer, hydrogenated styrene-butadiene-divinylbenzene copolymer, polybutadiene (homopolymer of butadiene), maleic anhydride-styrene-butadiene copolymer, methyl styrene copolymer, or a group formed by a combination thereof.

In an embodiment, the liquid rubber resin has 10 mol % to 90 mol % 1,2-vinyl and 0 mol % to 50 mol % styrene, and the Mw may be between 1000 and 5000 to effectively crosslink with other resins and improve compatibility, but the disclosure is not limited thereto.

In an embodiment, the polyphenylene ether resin is thermosetting polyphenylene ether resin and is a composition with terminal groups having styrene-type polyphenylene ether and terminal acrylic polyphenylene ether. For example, the structure of the styrene-type polyphenylene ether is shown in Formula (A):

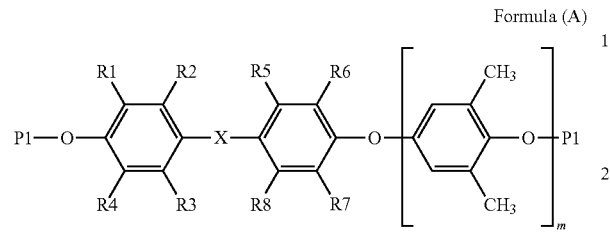

Formula (A)

In Formula (A), R1 to R8 may be a hydrogen atom, an allyl group, a C1 to C6 alkyl group, or selected from one or more of the above groups, and two of R1 to R8 may be the same or different; X may be: a single bond, O (oxygen atom), or the following linking groups:

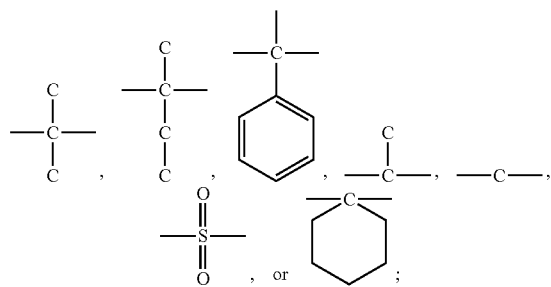

P1 may be styryl

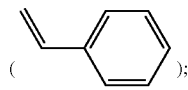

m may be an integer from 1 to 99.

The structure having terminal acrylic polyphenylene ether is shown in Formula (B):

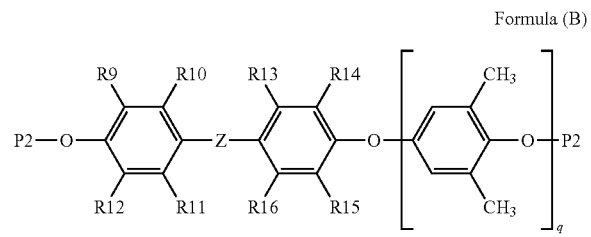

Formula (B)

In Formula (B), R9 to R16 may be a hydrogen atom, an allyl group, a C1 to C6 alkyl group, or selected from one or more of the above groups, and two of R9 to R16 may be the same or different; Z may be: a single bond, O (oxygen atom), or the following linking groups:

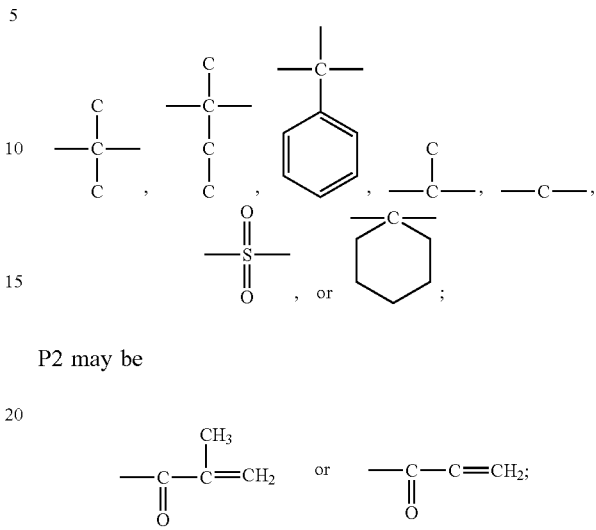

P2 may be $$-\overset{\phantom{O}}{\underset{O}{C}}-\overset{CH_3}{\underset{\phantom{O}}{C}}=CH_2 \quad \text{or} \quad -\overset{\phantom{O}}{\underset{O}{C}}-C=CH_2;$$

q may be an integer from 1 to 99.

Specific examples of the polyphenylene ether resin includes, but is not limited to, bishydroxy polyphenylene ether resin (for example, SA-90 from Saudi Basic Industries Corporation, or SABIC), vinyl benzyl polyphenylene ether resin (for example, OPE-2st from Mitsubishi Gas Chemical Company), methacrylate polyphenylene ether resin (for example, SA-9000 from SABIC), vinyl benzyl modified bisphenol A polyphenylene ether resin, or vinyl chain-extended polyphenylene ether resin. The polyphenylene ether is preferably vinyl polyphenylene ether.

In an embodiment, the Mw of the polyphenylene ether resin is between 100 g/mol and 6000 g/mol. For example, the Mw of the polyphenylene ether resin is between 300 g/mol to 5000 g/mol, and the Mw of the polyphenylene ether resin between 400 g/mol to 2500 g/mol gives favorable effect, but the disclosure is not limited thereto.

In an embodiment, the polyphenylene ether resin may further have at least one modified group, and the modified group may be selected from the group consisting of the following molecular groups: hydroxyl, amino, vinyl, styryl, methacrylate, and epoxy groups. The modified group of the polyphenylene ether resin may provide unsaturated bonds to facilitate crosslinking reaction to form a material with high glass transition temperature (Tg) and good heat resistance. In this embodiment, two opposite ends of the molecular structure of the polyphenylene ether resin both have a modified group, and the two modified groups are the same. In another embodiment, the modified group on the polyphenylene ether resin is a methacrylate group or a styryl group. In addition, the polyphenylene ether resin may include a variety of polyphenylene ether resin. For example, the polyphenylene ether of the disclosure may include first polyphenylene ether resin and second polyphenylene ether resin. Each molecular end of the first polyphenylene ether resin and the second polyphenylene ether resin has at least one modified group, and the modified group is selected from the group consisting of the following molecular groups: hydroxyl, amino, vinyl, styryl, methacrylate, and epoxy groups. The modified group of the first polyphenylene ether resin is different from the modified group of the second polyphenylene ether resin.

In an embodiment, the crosslinking agent is used to increase the degree of crosslinking of thermosetting resin, adjust the rigidity and toughness of the substrate, and adjust the processability. The type of the crosslinking agent used may be 1,3,5-triallyl cyanurate (TAC), triallyl isocyanurate (TAIC), trimethylallyl isocyanurate (TMAIC), diallyl phthalate, divinylbenzene, 1,2,4-triallyl trimellitate, etc., or a combination of one or more of the above.

In an embodiment, the resin composition further includes at least one of a flame retardant and an inorganic filler. Compared to a total of 100 parts by weight of the resin, the amount of the flame retardant used is between 5 parts by weight and 30 parts by weight (for example, 5 parts by weight, 10 parts by weight, 20 parts by weight, 30 parts by weight, or any value within 5 parts by weight to 30 parts by weight). Compared to a total of 100 parts by weight of the resin, the amount of the inorganic filler used is between 80 parts by weight and 180 parts by weight (for example, 80 parts by weight, 90 parts by weight, 100 parts by weight, 120 parts by weight, 140 parts by weight, 160 parts by weight, 180 parts by weight, or any value within 80 parts by weight to 180 parts by weight).

In an embodiment, the flame retardant may be a halogen-free flame retardant, and a specific example of the flame retardant may be a phosphorus flame retardant, which may be selected from phosphates, such as TPP, RDP, BPAPP, BBC, CR-733S, and PX-200; may be selected from phosphazenes such as SPB-100; ammonium polyphosphate, melamine polyphosphate (MPP), and melamine cyanurate; may be selected from more than one combinations of DOPO flame retardants, such as DOPO (for example, the following Formula (C)), DOPO-HQ (for example, the following Formula (D)), double DOPO derivative structure (for example, the following Formula (E)), etc.; and aluminum-containing hypophosphites (for example, the following Formula (F)).

Formula (C)

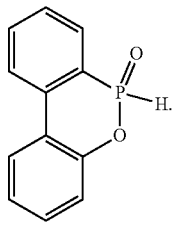

Formula (D)

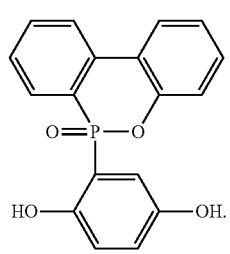

Formula (E)

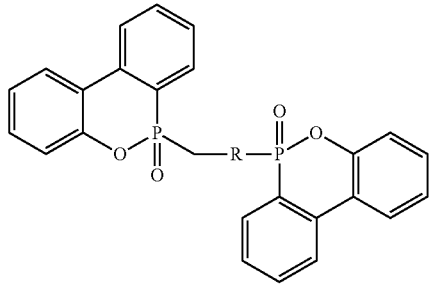

in which R may be $(CH_2)_r$,

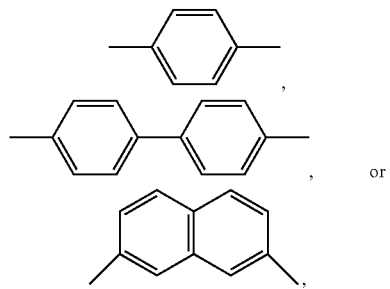

and r may be an integer from 1 to 4.

Formula (F)

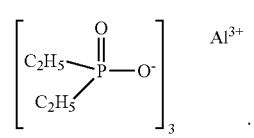

In an embodiment, the purpose of the inorganic filler is mainly to improve the mechanical strength and dimensional stability of the resin composition after hardening. The composition of the inorganic filler is selected from one or more of spherical or irregular $SiO_2$, $TiO_2$, $Al(OH)_3$, $Al_2O_3$, $Mg(OH)_2$, MgO, $CaCO_3$, $B_2O_3$, CaO, $SrTiO_3$, $BaTiO_3$, $CaTiO_3$, $2MgO·TiO_2$, $CeO_2$ or fume silica, BN, and AlN. The average particle size of the inorganic filler is preferably 0.01 microns to 20 microns. The fume silica is a porous nano-sized silica particle with an addition proportion of 0.1 wt % to 10 wt % and an average particle size of 1 to 100 nm. In addition, $SiO_2$ may be molten or crystalline. Considering the dielectric properties of the composition, $SiO_2$ is preferably molten silicon dioxide, such as 525ARI of Bao Lin.

It should be noted that the specific embodiments listed above are not a limitation of the disclosure. As long as the resin of a resin composition includes cyanate ester resin and bismaleimide resin and uses imidazole without acidic hydrogen as a catalyst, it shall fall within the protection scope of the disclosure. In addition, in some of the above structure formulae or functional groups, the hydrogen on the carbon is omitted for clarity.

The following examples and comparative examples are listed to illustrate the effects of the disclosure, but the scope of rights of the disclosure is not limited to the scope of the examples.

The copper clad laminates manufactured in the respective examples and comparative examples were evaluated according to the following methods.

The glass transition temperature (° C.) was tested by a dynamic mechanical analyzer (DMA).

288° C. solder resistance and heat resistance (seconds): After the sample was heated in a pressure cooker at 120° C.

The physical properties of the manufactured copper clad laminate were tested, and the results are shown in Table 1. After comparing the results of Examples 1 to 3 and Comparative Example 1 in Table 1, the following conclusion can be drawn: Compared to Comparative Example 1, Examples 1 to 3 can effectively improve heat resistance and electrical performance of a substrate made of the resin composition.

TABLE 1

|  |  | Example 1 | Example 2 | Example 3 | Comparative Example 1 |
|---|---|---|---|---|---|
| Resin (100 parts by weight in total) | Cyanate ester resin (BA230S) | 50 wt % | 50 wt % | 50 wt % | 50 wt % |
|  | Bismaleimide resin (KI-70) | 30 wt % | 30 wt % | 30 wt % | 30 wt % |
|  | Polyphenylene ether resin (SABIC SA9000) | 20 wt % | 20 wt % | 20 wt % | 20 wt % |
| Other additives (relative to 100 parts by weight of resin) | Flame retardant (Exolit® OP 935) | 8.6 parts by weight | 8.6 parts by weight | 8.6 parts by weight | 8.6 parts by weight |
|  | Inorganic filler (Silica (SC2500)) | 162.9 parts by weight | 162.9 parts by weight | 162.9 parts by weight | 162.9 parts by weight |
|  | Imidazole (1-cyanoethyl-2-phenylimidazole from Shikoku Chemicals) | 0.3 parts by weight | — | — | — |
|  | Catalyst (1-benzyl-2-phenylimidazole from Shikoku Chemicals) | — | 0.3 parts by weight | — | — |
|  | Catalyst (thiabendazole from Shikoku Chemicals) | — | — | 0.3 parts by weight | — |
|  | Catalyst (2-ethyl-4-methylimidazole from Shikoku Chemicals) | — | — | — | 0.3 parts by weight |
|  | Peroxide (Luf) | 0.3 parts by weight | 0.3 parts by weight | 0.3 parts by weight | 0.3 parts by weight |
| Glass transition temperature (° C.) |  | 267 | 268 | 265 | 270 |
| Heat resistance |  | Pass | Pass | Pass | Pass |
| Electrical performance (Dk/Df) |  | 3.4/0.0033 | 3.43/0.0033 | 3.5/0.0031 | 3.4/0.0039 |
| Peel strength |  | 6.79 | 7.18 | 6.99 | 6.79 | and 2 atm for 120 minutes, the sample was immersed in a 288° C. solder furnace, and the time required for the sample to delaminate was recorded.

Dielectric constant Dk: The dielectric constant Dk at a frequency of 10 GHz was tested by the dielectric analyzer HP Agilent E4991A.

Dielectric loss Df: The dielectric loss Df at a frequency of 10 GHz was tested by the dielectric analyzer HP Agilent E4991A.

Peel strength of copper foils (lb/in): The peel strength between a copper foil and a circuit carrier was tested.

Examples 1 to 3, Comparative Example 1

The resin composition shown in Table 1 was mixed with toluene to form a varnish of thermosetting resin composition. The varnish was impregnated with Nan Ya fiberglass cloth (cloth type 2013 from Nan Ya Plastics Corporation) at room temperature. Then, after drying for several minutes at 130° C. (impregnator), a prepreg with a resin content of 60 wt % was obtained. Finally, 4 pieces of the prepreg were stacked layer by layer between two layers of 35 μm thick copper foils. Under a pressure of 25 kg/cm² and a temperature of 85° C., a constant temperature was kept for 20 minutes. Then, after heating to 185° C. at a heating rate of 3° C./min, a constant temperature was kept again for 120 minutes. Then, slowly cool down to 130° C. to obtain a 0.5 mm thick copper clad laminate.

In summary, the resin composition of the disclosure selects the imidazole with favorable selectivity to reaction systems and without acidic hydrogen as a catalyst to improve reactivity of the resin that includes the cyanate ester resin and the bismaleimide resin, so the heat resistance and electrical performance of the substrate made of the resin composition may be effectively improved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A resin composition, comprising:
   a resin comprising cyanate ester resin and bismaleimide resin; and
   an imidazole without acidic hydrogen, wherein the imidazole comprises thiabendazole having the structure

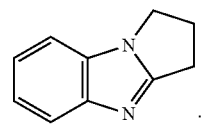 [SMILES: c1ccc2c(c1)nc1n2CCC1]

2. The resin composition according to claim 1, wherein the imidazole does not comprise 2-ethyl-4-methylimidazole.

3. The resin composition according to claim 1, wherein an amount of the imidazole used is between 0.1 parts by weight and 4 parts by weight, compared to a total of 100 parts by weight of the resin.

4. The resin composition according to claim 3, wherein an amount of the imidazole used is 1 part by weight.

5. The resin composition according to claim 1, wherein a proportion of the cyanate ester resin in the resin is between 10 wt % and 60 wt %, and a proportion of the bismaleimide resin in the resin is between 10 wt % and 50 wt %.

6. The resin composition according to claim 1, further comprising at least one of a flame retardant and an inorganic filler.

7. The resin composition according to claim 6, wherein an amount of the flame retardant used is between 5 parts by weight and 30 parts by weight, compared to a total of 100 parts by weight of the resin.

8. The resin composition according to claim 6, wherein an amount of the inorganic filler used is between 80 parts by weight and 180 parts by weight, compared to a total of 100 parts by weight of the resin.

\* \* \* \* \*